3,567,674
PROCESS OF PREPARING POLYAZO POLYMERS BY CATALYTIC COUPLING OF POLYMERS WITH TERMINAL PRIMARY AROMATIC AMINO GROUPS
Eduard Radlmann, Wolfhardt Schmidt, and Gunther Nischk, Dormagen, Germany, assignors to Farbenfabriken Bayer Aktiengesellschaft, Leverkusen, Germany
No Drawing. Filed Dec. 4, 1968, Ser. No. 781,279
Claims priority, application Germany, Dec. 14, 1967, F 54,311
Int. Cl. C08g 22/34, 51/54
U.S. Cl. 260—32.6      8 Claims

ABSTRACT OF THE DISCLOSURE

High molecular weight elastomeric polyazo polymers are made by the catalytic oxidative coupling of a linear aliphatic polymer, e.g. polyester, polyether, polythioether, or polyacetal, containing primary aromatic amino groups as the terminal portions of the polymer, the coupling being accomplished in the presence of a catalyst system comprising a copper salt and a basic organic compound containing a tertiary nitrogen atom.

---

This invention relates to high molecular weight, elastomeric polyazo polymers which are soluble in organic solvents, and to a process for their preparation.

It is known that predominantly linear polymers containing hydroxyl groups, such as aliphatic polyesters, polyethers, polythioethers and polyacetals can be converted into elastomeric materials by reaction with diisocyanates. For this purpose, the polymers containing hydroxyl groups are reacted with equivalent or excess quantities of polyisocyanates based on hydroxyl groups. In cases in which equivalent quantities are used, materials are obtained that are readily thermoplastically moulded and may be further processed with mixing machines commonly used in the rubber industry. During further processing, they may be vulcanised by additional incorporation of polyisocyanates, peroxides or sulphur. Such starting materials are also readily soluble in solvents and may be further processed from their solutions to form films, foils or fibres. In case of excess diisocyanate it is optionally possible by addition of further chain-extending agents to obtain high molecular weight products which are also thermoplastic or are crosslinked, depending upon the chosen ratio of NCO groups to hydroxyl groups.

However, not all the products obtained in this way with the aid of isocyanates are materials of high mechanical quality.

It is preferred to use symmetrically arranged polyisocyanates such as, for example, p-phenylene diisocyanate or 4,4′-diphenylmethane diisocyanate.

Furthermore materials containing azo groups in the molecule such as azobenzene 4,4′-diisocyanate, for example have been proposed as diisocyanates or chain extenders.

Furthermore polymers containing azo groups can be obtained by coupling bis-diazonium salts with poly-phenols, by decomposing bis-diazonium salts, by dehydrogenating diamines through free radicals or by polycondensing azobenzene derivatives. It is also known that almost insoluble azopolymers can be obtained from definite low molecular weight aromatic primary diamines with a cuprous chloride/pyridine catalyst system or with a dimethyl acetamide/cuprous chloride system used for the oxidative coupling of aniline or aniline derivatives to form azobenzene or azobenzene derivatives. Owing to the lack of solubility, however it is only possible to obtain polymers with comparatively low molecular weights which cannot be further processed into filaments or useful films. High molecular weight elastomeric polyazo polymers have so far remained unobtainable.

It is an object of this invention to provide new high molecular weight elastomeric polyazo polymers having the recurring structural unit (I):

—N=N—Ar—X—O—R—O—X—Ar—     (I)

wherein Ar represents a bivalent aromatic radical, X represents a member of the group consisting of —CO—, —NH—CO—, —NH—CS—,

—NH—CO—NH—R′—NH—CO— and —O—CO—NH—R′—NH—CO—, R′ represents the bivalent radical of an organic diisocyanate without the isocyanate groups, R represents the bivalent radical of a linear aliphatic polymeric compound selected from the group consisting of a polyester, a polyether, a polythioether and a polyacetal without the terminal hydroxyl groups, or a radical of the formula II:

—R″₍O—CO—NH—R′—NH—CO—OR″₎ₙ     (II)

wherein R′ is as defined above whilst R″ represents a linear aliphatic polymeric compound selected from the group consisting of a polyester, a polyether, a polythioether and a linear polyacetal without the terminal hydroxyl groups and $n$ represents 0 or an integer of from 1 to 10, said linear polymeric compound having a molecular weight in the range of from 500 to 5000, and said polyazo polymers having a solution viscosity above 50 poises as measured on a 20% solution at 20° C.

It is another object of this invention to provide a process for the production of high molecular weight elastomeric polyazo polymers which comprises oxidative coupling linear aliphatic polymeric compounds selected from the group consisting of a polyester, a polyether, a polythioether and a polyacetal, said polymeric compounds containing primary aromatic terminal amino groups, said oxidative coupling being effected at temperatures in the range of from 15° C. to 100° C. in a polar organic solvent in the presence of (a) a catalyst system composed of a copper salt and a basic organic compound containing a tertiary nitrogen atom and (b) of oxygen.

The aforementioned linear aliphatic polymeric compounds may optionally contain urethane, thiourethane and/or urea groups, and the oxidative coupling may optionally be carried out in the presence of low molecular weight primary aromatic amines which optionally may also contain urea, urethane, carbonamide or carboxylic acid ester groups.

Predominantly linear aliphatic polyesters, polyethers, polythioethers or polyacetals containing aromatic terminal amino groups may be prepared by a variety of methods. For example, the aforementioned predominantly linear polymers containing terminal hydroxyl groups may be reacted with nitroaryl carboxylic acids, nitroaryl isocyanates, nitroaryl carbamic acid chlorides or nitroaryl isothiocyanates, and the nitro groups are subsequently reduced to amino groups.

It is also possible, however, to react the aliphatic polyesters, polyethers, polythio ethers or polyacetals containing hydroxyl groups with aromatic or aliphatic diisocyanates in such a ratio as to promote chain extension to products of higher molecular weight containing free NCO groups, or in such a ratio that the ratio of NCO to OH groups is 2:1 or even greater.

If the molar ratio is such that chain extension occurs, it is preferred to choose a molar ratio which is such that from 2 to 10 polymer segments containing hydroxyl groups are linked by the diisocyanates.

In all cases, the isocyanate groups still present are subsequently reacted with aromatic diamines, nitroaryl amines, the OH groups of nitrophenols or nitroaryl alcohols or the carboxyl groups of nitroaryl carboxylic acids. In the first stage of the reaction between isocyanates and the starting products containing hydroxyl groups it is also possible to use further chain extenders such as glycols, dicarboxylic acids or diamines. In that case again an excess of isocyanate groups must be chosen. Then the polymers containing the residual terminal isocyanate groups are converted into the corresponding polymers containing terminal amino or nitro groups by the process described above. In the case of terminal nitro groups, the nitro groups are subsequently reduced.

It is also possible to use weakly branched aliphatic polyesters, polyethers or polyacetals and to carry out the reactions as described above. Branching may also be obtained by using trifunctional or higher functional isocyanates or chain extenders to a limited extent.

However, linear polymers containing aromatic terminal amino groups are preferably used in the process according to the invention. Aliphatic polyesters, polyethers, polythioethers and poly acetals containing hydroxyl groups which are suitable in the process according to the invention, include, for example, the polyesters that can be obtained from aliphatic dicarboxylic acids and glycols. Homo- or copolymers of alkylene oxides such as polyethylene oxide, polypropylene oxide or polytetrahydrofuran or condensation products of bis-β-hydroxy alkylsulphides such as thiodiglycol on its own or with other glycols may also be used. Polyacetals obtained for example from formaldehyde and glycols such as hexane diol or methyl hexane diols are also suitable.

Since aromatic amino groups or nitro groups are preferably introduced with the aid of isocyanates into the hydroxyl containing polymers, these polymers contain additionally urethane groups and in many cases carbonamide and urea groups. The terminal nitro groups being subsequently converted to aromatic amino groups by hydrogenation. Due to the development of intermolecular forces, these groups are of particular significance and impart excellent mechanical properties to the end products.

Suitable diisocyanates include all the diisocyanates that are normally used in the production of polyurethanes, 4,4′-diphenyl methane diisocyanate, 1,4′-diphenyl ether diisocyanate and hexamethylene diisocyanate being preferred.

Suitable aromatic diamines that are reacted with excess terminal NCO groups include for example n- or p-phenylene diamine, 4,4′-diamino diphenyl ether or 4,4′-di-aminodiphenylmethane.

Examples of suitable nitroaryl amines include, for example, m- or p-nitroaniline, 4-nitro-4′-aminodiphenyl ether or 4-nitro-3′-aminodiphenyl ether. In this case, additional urea groups are obtained. In cases in which nitroaryl carboxylic acids are used instead of nitroaryl amines, carbonamides are formed and this is accompanied by the elimination of carbon dioxide. The following are examples of suitable nitroaryl carboxylic acids: 3-nitrobenzoic acid, 4-nitro-4′-carboxy diphenylether or 1-nitro-naphthalene-5-carboxylic acid. Nitrophenols and nitrobenzyl alcohols are also suitable for the reaction with the polymers containing terminal NCO groups.

In cases in which the starting materials containing hydroxyl groups, namely the aliphatic polyesters, polyethers, polythioethers and polyacetals, are reacted with mononitroaryl isocyanates, non-extended polymers containing terminal nitro groups are formed. It is also possible, however, to react the starting materials containing hydroxyl groups with a deficit of diisocyanates, based on the OH groups, and then to saturate the residual hydroxyl groups with nitroaryl isocyanates.

The aliphatic polyesters, polyethers, polythioethers and polyacetals containing nitroaryl groups are converted to diamines by catalytic hydrogenation. Since this hydrogenation reaction is normally carried out in solution, the subsequent oxidative coupling is preferably carried out in the presence of copper/nitrogen complexes without isolating the resulting intermediate polymers.

The molecular weight of the used aliphatic polymers containing hydroxyl groups which are used is in the range of from 500 to 5000, whilst the molecular weight of the polymers containing primary amino groups is in the range of from 800 to 1500, and preferably in the range of from 1000 to 5000.

It is also possible to use low molecular weight aromatic diamines such as 4,4′-diaminodiphenyl ether, 4,4′-diaminodiphenyl methane or 1,3-diaminobenzene in admixture with these high molecular weight diamines. It is preferred to use low molecular weight aromatic diamines of the kind that additionally contain urea groups, urethane groups or carbonamide or ester groups, such as, for example compounds of the following formulae:

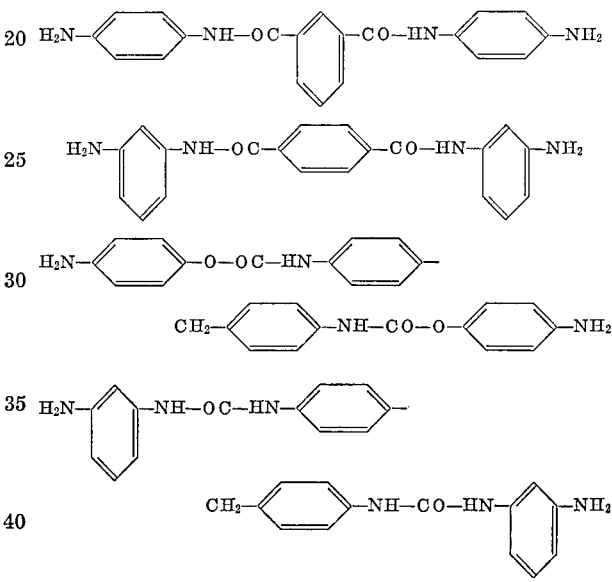

Suitable catalyst systems include combinations of copper salts of hydrochloric acid, hydrobromic acid, sulphuric acid, nitric acid or aliphatic carboxylic acids such as acetic acid, preferably aliphatic cuprous chloride, with tertiary aliphatic, cycloaliphatic, aliphatic-cyclo-aliphatic, or aromatic mono- and polyamines. Trimethyl amine, dicyclohexyl-methyl amine, N,N,N′,N′-tetramethyl ethylene diamine and pyridine are mentioned as examples of amine components of this kind. It is also possible to use amidines as amine components, the following being mentioned as examples.

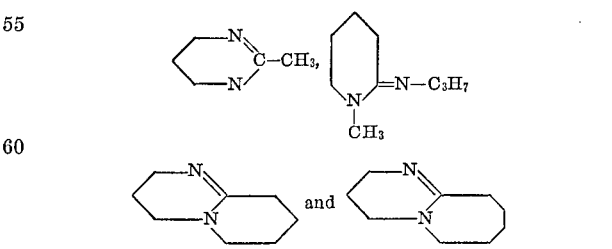

It is of course also possible to use mixtures of different bases and also N,N-disubstituted carbonamides.

Solvents are suitable in which the high molecular weight diamine may be prepared and also the diamine may be coupled by oxidation to the polyazo compound. N,N-dialkylated carboxylic acid amides such as dimethyl formamide, N,N-dimethyl acetamide or N-alkylated pyrrolidones such as N-methyl pyrrolidone are particularly suitable.

It is not absolutely necessary to use pure oxygen to carry out the oxidative coupling. Mixtures of oxygen with inert gases such as air or oxygen/rare gas mixtures may also be used.

In a preferred embodiment of the process according to the invention, the catalyst system of cuprous salt and the nitrogen-containing component is dissolved in one of the aforementioned solvents. Air is then introduced. After the cuprous salt has been oxidised by the oxygen, the catalyst complex is formed. The diamine is then added in solution. To prepare high molecular weight polyazo polymers, oxygen or a gas containing oxygen is introduced at a temperature of from 15° C. to 100° C. and preferably at a temperature in the range of from 20° C. to 70° C., over a reaction period of from 5 to 30 hours. The solution may have a solids content of from 5% to 40%. After completion of the reaction, the polyazo polymers may either be directly processed from the solution after addition of volatile acids, for example acetic acid, in order to destroy the catalyst, or alternatively it may be isolated by pouring the solution into acidified precipitants.

In order to obtain polymers having high molecular weights, the molar ratio between the copper and the high molecular weight diamine may vary within wide limits. Molar ratios of from 1:1 to 1:50 are preferred. The molar ratio between the copper and the nitrogen catalyst component may also be varied over a wide range. The components are preferably used in a ratio of from 1:2 to 1:100.

It is possible by the methods described above to obtain highly viscous solutions which may be further processed directly to films or foils. It is also possible to subject these solutions to dry or wet spinning in order to obtain highly elastic filaments and fibres which are distinguished by their outstanding mechanical properties.

Unlike polyurethane elastomers, the polyazo polymers according to the invention do not contain any thermally labile groups such as allophanate or biuret groups, and for this reason show outstanding thermal stability.

It is also possible to precipitate the novel high molecular weight polyazo polymers from their solutions by the addition of precipitants. After washing out, highly elastic rubber-like compositions are obtained which may be further processed on mixing rolls, as in the processing of rubber, and which may be vulcanised by the addition of peroxides or isocyanates, in which case moulding may take place, for example, in calenders or injection moulding machines.

The following examples are to further illustrate the invention without limiting it.

EXAMPLE 1

Preparation of the elastomer with the recurring structural unit

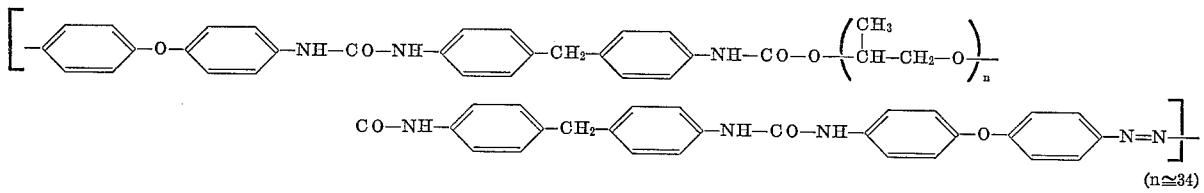

127 parts by weight of 4,4'-diphenyl methane diisocyanate are added to 500.0 parts by weight of polypropylene oxide (OH No. 56.0, $\overline{M}n=1968$), and the resulting mixture is stirred for 1 hour at 100° C. The melt is then dissolved in 500 parts by weight of dimethyl formamide. A solution of 128 parts by weight of 4-nitro-4'-amino diphenyl ether in 200 parts by weight of dimethyl formamide is added all at once to this solution with stirring at 80° C. This is followed by 2 hours' stirring at 80° C.

The dimethyl formamide solution is hydrogenated with 70 parts by weight of Raney nickel in an autoclave for 4 hours at 70° C. and at a hydrogen pressure of 50 atms. Following separation of the nickel catalyst, the solution is diluted with 2300 parts of dimethyl formamide to a polymer content of about 20%.

15 parts by weight of anhydrous cuprous chloride and 600 parts by weight of pyridine are introduced into a flask equipped with a stirring mechanism, thermometer, reflux condenser and gas inlet tube. Air is passed through with stirring at room temperature over a period of about 40 minutes until the copper salt has been completely dissolved. The 20% dimethyl formamide solution of the diamine is then added, and air is introduced with vigorous stirring over a period of 6 hours at 50° C. At the end of this time, the viscosity required for spinning of 618 poises at 20° C., as measured in a Hoeppler viscometer, is obtained. In order to destroy the catalyst, 500 parts by weight of glacial acetic acid are stirred into the solution. The solution is then converted into films, or is wet or dry spun into elastic filaments showing the following mechanical properties:

Fineness—260 den.
Strength—0.57 g./den.
Elongation—550%.
Softening point—241° C.

EXAMPLE 2

Preparation of the elastomer with the recurring structural unit

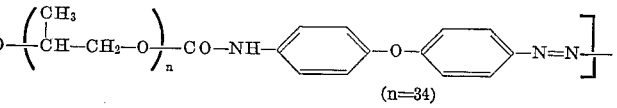

66.5 parts by weight of 4-isocyanato-4'-nitrodiphenyl ether are added to 250.0 parts by weight of polypropylene oxide (OH No. 56.9 $\overline{M}n=1968$), and the resulting mixture is stirred for 3 hours at 110° C. The melt is then dissolved in 1000 parts by weight of dimethyl formamide and the resulting solution is hydrogenated with 50 parts of Raney nickel for a period of 4 hours at 60° C. under a hydrogen pressure of 60 atms. Following removal of the Raney nickel, the solution is diluted with 266 parts by weight of dimethyl formamide to a polymer content of about 20%.

7.5 parts by weight of anhydrous cuprous chloride and 100 parts by weight of pyridine are introduced into a flask equipped with a stirring mechanism, a thermometer, a reflux condenser and a gas inlet tube. Air is then introduced with stirring at room temperature until the copper salt has been completely dissolved. The 20% diamine solution is then added. Air is introduced with vigorous stirring at 50° C. until the solution has the viscosity of 675 poises (as measured in a Hoeppler viscometer at 20°

C.) required for dry spinning. This takes about 4 to 5 hours. 300 parts by weight of glacial acetic acid are then added in order to destroy the catalyst and the elastomer is precipitated by spraying the solution into water acidified with glacial acetic acid. The precipitated polymer can be converted into a crosslinked product by rolling polyisocyanates into it.

EXAMPLE 3

Preparation of the elastomer with the recurring structural unit

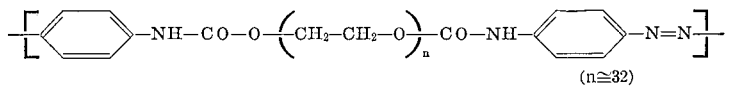

(n≅32)

1040 parts by weight of polyethylene glycol ($\overline{M}n=1400$) are dissolved at 70° C. in 300 parts by weight of chlorobenzene. After cooling to 40° C., 1110 parts by weight of a 26% solution of 4-nitrophenyl-isocyanate in chlorobenzene are added. The temperature rises to 65° C. This is followed by 2 hours' stirring at 100° C. Following removal of the chlorobenzene by vacuum distillation, the residue is dissolved in 4800 parts by weight of dimethyl formamide to form an approximately 20% solution and the resulting solution is reduced for 7 hours in an autoclave at 50° C. under a hydrogen pressure of 60 atms. in the presence of 150 parts by weight of Raney nickel. The Raney nickel is removed from the solution by filtration.

25 g. of cuprous chloride and 800 parts by weight of pyridine are introduced into a flask equipped with a stirring mechanism, a thermometer, a reflux condenser and a gas inlet tube, air being introduced with stirring at room temperature until the copper salt has been completely dissolved. The approximately 20% dimethyl formamide solution of the diamine is then added. Air is then introduced with vigorous stirring over a period of some 7 hours at room temperature until a viscosity of 825 poises has been obtained (as measured in a Hoeppler viscometer at 20° C.). 1000 parts by weight of glacial acetic acid are then stirred in and the resulting solution is dry spun into elastic filaments showing outstanding mechanical properties.

EXAMPLE 4

119 parts by weight of 4,4'-diphenyl methane diisocyanate are added to a mixture of 250.0 parts by weight of polypropylene oxide (OH No. 56.9, $\overline{M}n=1968$) and 10.0 parts by weight of 1,4-butane diol, and the resulting mixture is stirred for 2 hours at 100° C. The melt is dissolved in 1000 parts by weight of dimethyl formamide. A solution of 79.5 parts by weight of 3-nitrobenzoic acid in 300 parts by weight of dimethyl formamide is added to the solution at 70° C., followed by 4 hours' stirring at 70° C.

The solution is hydrogenated with 70 parts of Raney nickel in an autoclave for 3 hours at a temperature of 50° C. under a hydrogen pressure of 50 atms. Following the removal of the Raney nickel by filtration, the solution is diluted to a polymer content of approximately 20% with 1000 parts by weight of dimethyl formamide. The solution is then introduced into a flask equipped with a gas inlet tube, a thermometer, a stirring mechanism and a reflux condenser, in which 10 parts by weight of anhydrous cuprous chloride, 50 parts by weight of the bicyclic amidine:

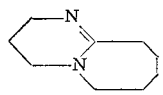

and 50 parts by weight of dimethyl formamide have had air passed through to complete dissolution of the copper salt. Air is passed through the system with stirring at 50° C. until, after some 5 to 6 hours, the solution has a viscosity of 480 poises (as measured in a Hoeppler viscometer at 20° C.). The elastomer is isolated by spraying the solution into water acidified with glacial acetic acid, and the catalyst is removed. After drying, it is redissolved in dimethyl formamide and the resulting solution is converted into films or wet spun into filaments with the following textile properties:

Fineness—400 den.
Strength—0.65 g./den.
Elongation—450%
Softening point—248° C.

EXAMPLE 5

Preparation of the elastomer with the recurring structural unit

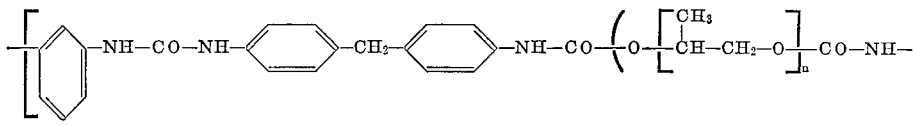

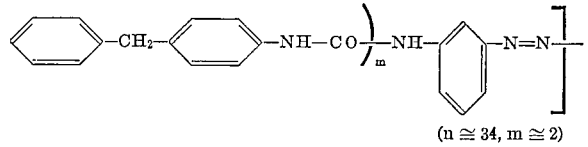

(n ≅ 34, m ≅ 2)

95.3 parts by weight of 4,4'-diphenyl methane diisocyanate are added to 500.0 parts by weight of polypropylene oxide (OH No. 56.9, $\overline{M}n=1968$), and the resulting mixture is stirred for 2 hours at 140° C. The melt is then dissolved in 1000 parts by weight of N,N-dimethyl acetamide. A solution of 38.5 parts by weight of 3-nitro-aniline in 100 parts by weight of N,N-dimethyl acetamide is added to the resulting solution at a temperature of 70° C. This is followed by 4 hours' stirring at 70° C. The solution is then reduced with 80 parts by weight of Raney nickel in an autoclave for a period of 5 hours at 60° C. under a hydrogen pressure of 40 atms. The nickel catalyst is then separated off and the solution is diluted to a polymer content of approximately 20% with another 1435 parts by weight of N,N-dimethyl acetamide. The solution is then transferred to a flask equipped with stirring mechanism, a reflux condenser, a thermometer and a gas inlet tube. The flask accommodates the catalyst system obtained by introducing air into a mixture of 20 parts by weight of anhydrous cuprous chloride and 200 parts by weight of pyridine. Air is then introduced with vigorous stirring at 50° C. until, after some 4 hours, the solution has a viscosity of 450 poises (as measured in a Hoeppler viscometer at 20° C.). 500 parts by weight of glacial acetic acid are then stirred in and the polymer is precipitated. It may be converted to a cross-linked product by rolling in a polyisocyanate.

EXAMPLE 6

78.8 parts by weight of diphenyl-ether-4,4'-diisocyanate are added to a mixture of 250.0 parts by weight of an aliphatic polyester of adipic acid and 1,4-butane diol containing terminal hydroxyl groups (OH No. 56.1, $\overline{M}n=2000$), and the resulting mixture is stirred for 2 hours at 125° C. The melt is dissolved in 800 parts by weight of dimethyl formamide, and to the resulting solution was added a solution of 86.3 parts by weight of 3-amino-4'-nitrodiphenyl-ether in 200 parts by weight of dimethyl formamide. This is followed by 3 hours' stirring at 80° C. The solution is then reduced with 60 parts by weight of Raney nickel in an autoclave over a period of 3 hours at 50° C. under a hydrogen pressure of 40 atms. Following the removal of the nickel catalyst, the reduction solution is diluted to a content of 20% by the addition of 1075 parts by weight of dimethyl formamide. The solution is then transferred to a flask which is equipped with a gas inlet tube, a reflux condenser, a stirring mechanism and a thermometer and which accommodates the catalyst obtained by introducing air into a mixture of 8 parts by weight of cuprous chloride and 200 parts by weight of pyridine until a solution is obtained. Air is then introduced with vigorous stirring at 60° C. until, after some 5 hours, a spinnable solution with a viscosity of 428 poises (as measured in Hoeppler viscometer at 20° C.) has been obtained. 300 parts by weight of glacial acetic acid are then added with thorough mixing, and some of the solution being wet spun into elastic filaments. The rest of the solution is precipitated by spraying into an excess of water acidified with acetic acid. After drying, the elastomer is converted into films from a dimethyl formamide solution. The elastic filaments show the following mechanical properties:

Fineness—280 den.
Strength—0.58 g./den.
Elongation—580%
Softening point—241° C.

EXAMPLE 7

Preparation of the elastomer with the recurring structural unit and is then wet spun into brown coloured elastomer filaments with the following mechanical properties:

Fineness—320 den.
Strength—0.56 g./den.
Elongation—620%
Softening point—245° C.

EXAMPLE 8

Preparation of the elastomer with the recurring structural unit

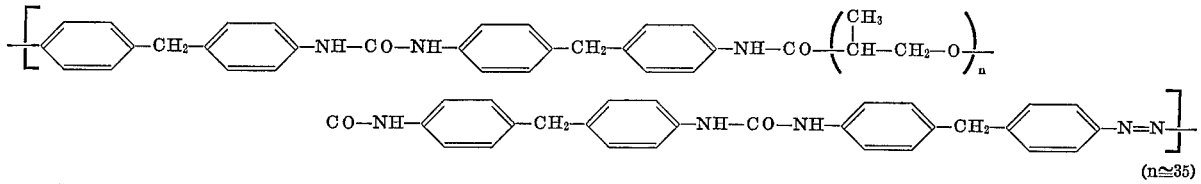

62.0 parts by weight of 4,4'-diphenyl-methane-diisocyanate are added to 250.0 parts by weight of polypropylene oxide (OH No. 55.7, $\overline{M}n=2015$), and the resulting mixture is stirred for 1 hour at 100° C. The melt is dissolved in 1000 parts by weight of N,N-dimethylformamide, and is added to a solution of 54.1 parts by weight 4,4'-diamino-diphenyl-methane in 466 parts by weight of N,N'-dimethylformamide at room temperature. This is followed by 10 hours' stirring at room temperature. The 20% solution is transferred to a flask which is equipped with a stirring mechanism, a reflux condenser, a thermometer and gas inlet tube and which accommodates the catalyst system obtained by introducing air into a mixture of 10 parts by weight of anhydrous cuprous chloride and 100 parts by weight of pyridine. Air is passed through with vigorous stirring for a period of 8 hours at 50° C. until the solution has a viscosity of 984 poises (as measured in a Hoeppler viscometer at 20° C.). In order to destroy the catalyst, 200 parts by weight of glacial acetic acid are added to the solution which may then be converted to foils or wet or dry spun into elastic filaments with the following mechanical properties:

Fineness—506 den.
Strength—0.58 g./den.
Elongation—480%
Softening point—234° C.

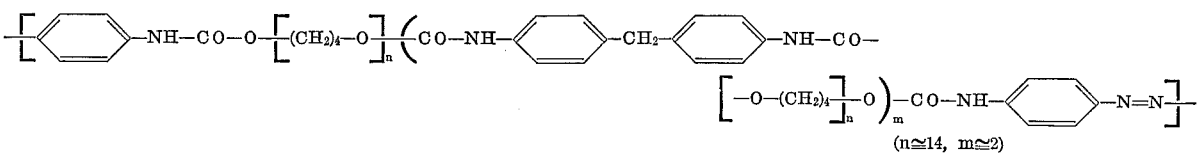

43.8 parts by weight of 4,4' - diphenyl - methane - diisocyanate are added to 250.0 parts by weight of polytetrahydrofurane (OH No. 112.4, $\overline{M}n=1000$), and the resulting mixture is stirred for 1 hour at 100° C. 38.5 parts by weight of 4 - isocyanato - 4' - nitrodiphenyl-ether are then added, and the resulting mixture is kept at 100° C. for 2 hours. The melt is then dissolved in 1329 parts by weight of dimethyl formamide and the resulting solution is reduced in an autoclave with 60 parts by weight of Raney nickel over a period of 3½ hours at 50° C. under a hydrogen pressure of 40 atms. The nickel catalyst is removed by filtration under suction and the solution is transferred to a glass flask which is equipped with a gas inlet tube, a reflux condenser, a stirring mechanism and a thermometer and which accommodates the catalyst solution obtained by introducing air into a mixture of 5 parts by weight of cuprous chloride and 250 parts by weight of pyridine. Air is then introduced with vigorous stirring at 45° C. until, after 9 hours, the solution has a viscosity of 831 poises (as measured in a Hoeppler viscometer at 20° C.). Following the addition of 250 parts by weight of glacial acetic acid, the solution is thoroughly stirred

What we claim is:
1. A process for the production of a high molecular weight elastomeric polyazo polymer having a solution viscosity above 50 poises as measured on a 20% solution of dimethyl formamide at 20° C. and having the recurring structural unit (I):

—N=N—Ar—X—O—R—O—X—Ar—  (I)

wherein
Ar represents a bivalent aromatic radical,
X represents a member of the group consisting of —CO—, —NH—CO—, —NH—CS—,

—NH—CO—NH—R'—NH—CO— and —O—CO—NH—R'—NH—CO—, R' represents the bivalent radical of an organic diisocyanate without the isocyanate groups,
R represents the bivalent radical of a linear aliphatic polymer having a molecular weight in the range of 500 to 5000 and being selected from the group consisting of a polyester, a polyether, a polythioether and a polyacetal without the terminal hydroxylgroups, or a radical of the Formula II:

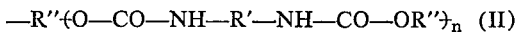

wherein
R' is defined as above,
R" represents a linear aliphatic polymeric compound selected from the group consisting of a polyester, a polyether, a polythioether and a linear polyacetal without the terminal hydroxyl groups and $n$ represents an integer from 1 to 10;

said process comprising oxidative coupling of linear aliphatic polymers of the general Formula III:

$$H_2N-Ar-X-O-R-O-X-Ar-NH_2 \quad (III)$$

wherein Ar, X, and R, have the same meaning as defined above in the presence of (a) a catalyst system consisting essentially of a copper salt of an acid selected from the group consisting of hydrochloric, hydrobromic, sulfuric, nitric, and aliphatic carboxylic, and a basic organic compound containing a tertiary nitrogen atom selected from the group consisting of tertiary aliphatic, cycloaliphatic, aliphatic-cycloaliphatic, and aromatic mono- and polyamines, amidines, and N,N-disubstituted carbonamides, and (b) oxygen.

2. The process of claim 1 wherein said oxidative coupling is effected at a temperature from about 15° C. to about 100° C. in a polar organic solvent.

3. The process of claim 2 wherein said linear aliphatic polymer is a polyether.

4. The process of claim 2 wherein said linear aliphatic polymer is a polyester.

5. The process of claim 1, said oxidative coupling being effected in the presence of low molecular weight primary aromatic diamines.

6. The process of claim 1, said oxidative coupling being effected in the presence of low molecular weight primary aromatic diamines, said low molecular weight primary aromatic diamines containing additional functional groups, selected from the group consisting of urea, urethane, carboxylic acid amide and carboxylic acid ester groups.

7. The process of claim 1, said polar organic solvent being dimethyl formamide.

8. The process of claim 1, said polar organic solvent being dimethylacetamide.

References Cited
UNITED STATES PATENTS 3,014,894  12/1961  Mueller et al. _____ 260—75
3,450,648  6/1969  Windemuth et al. _____ 260—2.5

HOSEA E. TAYLOR, Primary Examiner

H. S. COCKERAM, Assistant Examiner

U.S. Cl. X.R.
260—67, 75, 77.5